United States Patent [19]

Siol et al.

[11] Patent Number: 5,219,935
[45] Date of Patent: Jun. 15, 1993

[54] IMPACT MODIFIED SYNTHETIC RESINS

[75] Inventors: Werner Siol, Darmstadt-Eberstadt; Jens-Dieter Fischer, Darmstadt; Klaus Koralewski, Riedstadt; Ulrich Terbrack, Reinheim, all of Fed. Rep. of Germany

[73] Assignee: Röhm GmbH, Darmstadt, Fed. Rep. of Germany

[21] Appl. No.: 454,148

[22] Filed: Dec. 21, 1989

Related U.S. Application Data

[62] Division of Ser. No. 283,986, Dec. 13, 1988, Pat. No. 4,906,699.

[30] Foreign Application Priority Data

Dec. 19, 1987 [DE] Fed. Rep. of Germany ....... 3743199

[51] Int. Cl.$^5$ .................... C08L 51/08; C08L 69/00
[52] U.S. Cl. .......................... 525/67; 525/70;
525/72; 525/75; 525/80; 525/85; 525/216;
525/222; 525/308
[58] Field of Search .............. 525/70, 67, 76, 83,
525/85, 80, 72, 216, 222, 308, 75

[56] References Cited

U.S. PATENT DOCUMENTS

| 4,245,058 | 1/1981 | Liu | 525/148 |
| 4,320,212 | 3/1982 | Liu | 525/148 |
| 4,503,183 | 3/1985 | Liu | 524/504 |
| 4,906,699 | 3/1990 | Siol | 525/67 |

FOREIGN PATENT DOCUMENTS

| 11076377 | 2/1960 | Fed. Rep. of Germany | 525/148 |
| 11127086 | 4/1962 | Fed. Rep. of Germany | 524/504 |
| 13031524 | 3/1981 | Fed. Rep. of Germany | 525/148 |
| 23031539 | 3/1981 | Fed. Rep. of Germany | 525/148 |
| 13248709 | 8/1983 | Fed. Rep. of Germany | 524/504 |
| 21164299 | 5/1958 | France | 524/504 |
| 22464287 | 3/1981 | France | 525/297 |
| 49-14557 | 2/1974 | Japan | 525/297 |
| 58-104939 | 6/1983 | Japan . | |
| 62-004711 | 1/1987 | Japan . | |
| 62-151415 | 7/1987 | Japan . | |
| 30372844 | 12/1963 | Switzerland | 525/67 |
| 22057461 | 4/1961 | United Kingdom | 525/297 |
| 30937747 | 9/1963 | United Kingdom | 525/67 |
| 12057462 | 4/1981 | United Kingdom | 525/67 |
| 22057464 | 4/1981 | United Kingdom | 525/85 |

OTHER PUBLICATIONS

Kirk-Othmer, Encyclopedia of Chemical Technology, 3rd Edition, vol. 6, John Wiley & Sons, New York, p. 469.

Kirk-Othmer, op. cit., 2nd edition, vol. 17, pp. 646-651.

Primary Examiner—Jacob Ziegler

[57] ABSTRACT

A composition universally usable as an impact modifier for synthetic resins comprising (A) from 10 to 80 percent by weight of a polymer of the formula

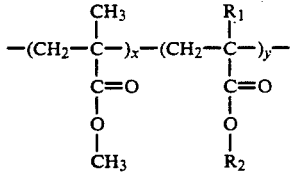

wherein $R_1$ is hydrogen or methyl, $R_2$ is $C_5$-$C_7$ cycloalkyl or such cycloalkyl substituted by $C_1$-$C_{12}$ alkyl, y has a value such that the corresponding monomer or monomers are from 5 to 50 percent by weight of polymer (A), and x has a value such that the corresponding monomer, together with up to 20 percent by weight of one or more optional comonomers, is the balance by weight, and (B) from 20 to 90 percent by weight of an optionally crosslinked polymer having a glass transition temperature, $T_g$, below 10° C. and preferably less than −10° C., polymer (B) being at least partially bonded covalently to polymer (A).

5 Claims, No Drawings

IMPACT MODIFIED SYNTHETIC RESINS

This application is a divisional application of application Ser. No. 07/283,986 filed Dec. 13, 1988, now U.S. Pat. No. 4,906,699.

The present invention relates to universally usable impact modifiers for synthetic resins.

THE PRIOR ART

In many areas of use for plastics, their toughness under shock loading is an important consideration. The experimentally determinable value of notched-bar impact strength (DIN 53 453) can serve as a basis for an evaluation of whether a polymeric material is able to absorb impact-like mechanical stresses without undergoing brittle fracture, in other words whether the material is able to convert the energy introduced through reversible or irreversible deformation.

In addition to toughness, properties which are of importance in the case of a modern construction material include the modulus of elasticity, strength, and deflection temperature (heat distortion point).

A number of important engineering plastics, and particularly thermoplastics, leave much to be desired so far as their impact strength is concerned.

The need for turning relatively brittle plastics into useful engineering materials with improved impact strength has long been recognized in the art.

Impact polystyrene is a classic example of impact modification. It is produced by the polymerization of monomeric styrene in which polybutadiene has been dissolved. Even at low levels of conversion, polystyrene segregates as drops. When the polymerizing mixture is stirred, phase inversion occurs with increasing polystyrene content, with polybutadiene forming the dispersed phase. At the phase boundary, graft copolymerization sets in through chain transfer. The dispersed state is thus stabilized and the rubber graft particles are anchored in the polystyrene matrix. Capsule particles in which the crosslinked polybutadiene phase is partially filled with hard phase are as a rule particularly effective. The capsule particles assure high effectiveness of the rubber used. This conceptual model is applicable to many other impact-modified polymer systems.

In ABS polymers, the matrix phase, or "hard phase", is a styrene-acrylonitrile copolymer and the dispersed rubber phase, or "tough phase" is a butadiene-acrylonitrile copolymer. The considerably higher-impact polyvinyl chloride can be similarly modified by the admixture of rubber. (See Ullmanns *Enzyklopadie der technischen Chemie*, 4th ed., vol. 15, p. 216, Verlag Chemie, or *Polymere Werkstoffe*, H. Batzer, ed., vol. III, Technologie 2, pp. 20-23, Georg Thieme Verlag, 1984.) Much space has been devoted in the literature to the efforts made in the art to bring about the impact modification (elastification) of commonly used plastics, and especially thermoplastics. One published paper reports on the elastification of polybutylene terephthalate, polyamides, and polycarbonates with butadiene graft polymers. (D. Neuray et al., Angew. Makromol. Chem. 98, 213-244 [1981].) Apart from linear polyolefins, elastomeric ethylene-propylene-diene (EPDM) terpolymers, acrylic ester-butadiene-rubber (ABR), and butadiene rubber (BR), as well as styrene-butadiene rubber (SBR) graft polymers have been suggested for the modification of polyamides. Here too the thermoplast forms the coherent phase in which the finely divided elastomer is embedded. (See F. Fahnler et al., Kunststoffe 75 (3), 157-163 [1985].)

It is pointed out that without a "coupling" of a physical or chemical nature to the matrix, toughness cannot be significantly improved even with increasing elastomer content.

The impact modification of polycarbonate by the addition of elastomers has also been frequently described. For example, published German patent application OS 30 31 524 recommends the addition of alkyl acrylate or methacrylate polymers and olefin-alkyl acrylate copolymers. The addition of butadiene-styrene copolymers, apart from alkyl acrylate or methacrylate polymers, to polycarbonate has also been described (published French patent application 2,464,387, British patent 2,057,461), as has the addition of polypropylene (U.S. Pat. No. 4,245,058), organic silicones (published German patent application OS 30 31 539), polyester (U.S. Pat. No. 4,230,212), and ABS copolymers (published German patent application OS 3,248,709). Polyolefin-modified polycarbonate has found practical use in the automobile industry.

Commonly used impact modifiers for rigid polyvinyl chloride include both products on an additive basis (for example, chlorinated polyethylene, methyl methacrylate-butadiene-styrene copolymers, butyl acrylate-methyl methacrylate copolymers) and graft copolymers (EVA, polyacrylate). (See M. Arts et al. in Kunststoffe 75, 224-228 [1985], Swiss patent 372,844, British patent 937,747.) Thermoplastic polyurethanes are among the materials used for the impact modification of acetal copolymers. (See F. Kloose and E. Wolters, Kunstoffe 75 (10), 735-739 [1985].)

For the impact modification of polymethyl methacrylate (PMMA), elastomers such as polybutyl-acrylate rubber particles provided with a PMMA shell are used successfully. (See published German patent applications AS 10 76 377 and AS 11 27 086, French patent 1,164,299.)

In the prior art, the coupling of the "tough phase" to the "hard phase" is accomplished predominantly by the expedient of grafting the monomer onto the tough phase. Usually the general rule that like dissolves like is held to apply, with the anchoring of the tough phase in the hard phase thought to come about in this way. This concept means, of course, that a specific impact modifier optimized for a particular case is employed for each individual synthetic resin such as polymethyl methacrylate, polyvinyl chloride, polystyrene; polycarbonate, etc.

Making available impact modifiers of a single type that would lend themselves to use with different types of resins thus seemed a highly desirable though probably unattainable goal. Such impact modifiers would, further, have to be readily producible and usable by existing techniques.

Surprisingly, it has now proved possible to develop impact modifiers which meet these requirement to a high degree. The universally usable impact modifier of the invention is an at least two-phase synthetic resin composition comprising (A) from 10 to 80 percent by weight of a polymer of the formula

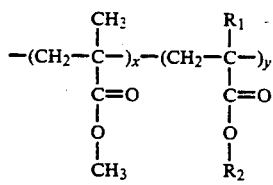

wherein $R_1$ is hydrogen or methyl, $R_2$ is $C_5$-$C_7$ cycloalkyl or such cycloalkyl substituted by $C_1$-$C_{12}$ alkyl, preferably cyclohexyl, and wherein x and y, optionally together with further monomers present in amounts from 0 to 20 percent by weight, add up to 100 percent by weight, with y accounting for from 5 to 50, and preferably from 10 to 40, percent by weight, and (B) from 90 to 20 percent by weight of an optionally crosslinked polymer having a glass transition temperature, $T_g$, of less than 10° C., and preferably less than $-10°$ C., which is at least partially covalently bonded to (A).

If terminal groups of polymer (A) are present, they correspond to those which are usually formed on polymerization of the respective monomers, e.g. are formed from residues of an initiator such as a peroxide or of a chain regulator such as a mercaptan or may be a terminal ring. (See Kern et al., Z. f. Elektrochemie 60, pp. 309-317 [1956].)

THE PLASTIC MATERIAL

The plastic material by definition incorporates component (A). In the formula, $R_1$ preferably is methyl. The further monomers, present in amounts from 0 to less than 20, and preferably from 0.5 to 20, percent by weight, are free-radically polymerizable vinyl compounds, more particularly vinyl esters and compounds of acrylic and methacrylic acids. (See Ullmanns *Enzyklopadie der technischen Chemie*, 3rd ed., vol. 14, pp. 108-110, Urban and Schwarzenberg, 1963.) Of special interest are esters of acrylic and methacrylic acid having alcohol moieties different from $R_2$ and preferably having from 1 to 18 carbon atoms.

Known crosslinking monomers may be used, that is monomers having at least two unsaturations capable of free-radical activation in the molecule, such as the acrylic or methacrylic acid esters of diols and polyols, for example ethylene glycol dimethacrylate or, particularly, allyl compounds such as triallyl cyanurate. They are preferably used in amounts from 0.1 to 5 percent by weight. The monomers to be incorporated in polymer component (A) are known. In the preparation of component (A), a chain transfer agent for example like the known organosulfur modifiers (see H. Rauch-Puntigam et al., *Acryl-und Methacrylverbindungen*, Springer-Verlag, Heidelberg, 1967), may further be used, generally in amounts of from 0.05 to 1 percent by weight, based on the monomers.

The polymer of component (B) is covalently bonded to (A) at least partially, that is, to the extent of more than 5 percent, and up to 100 percent, by weight, based on component (B).

By definition, this polymer has a glass-transition temperature $T_g$ of less than 10° C., and preferably less than $-10°$ C., in other words, it is one of the polymers which are usually referred to as "rubbers".

Optionally the polymer of component (B) is crosslinked.

The glass-transition temperature $T_g$ may be determined by the procedure set forth on pp. 169 ff. in "Thermal Characterization of Polymeric Materials", Edith A. Turi, ed., Academic Press, New York, 1981. The polymer of component (B) is preferably selected from the group consisting of polyolefins, polydienes, polyacrylates, ethylene-vinyl acetate copolymers, and polysiloxane.

The polyolefins are preferably homo- or copolymers of ethylene, propylene or isobutylene. (See Ullmanns *Enzyklopadie der technischen Chemie*, 4th ed., vol. 19, pp. 167-226, Verlag Chemie, 1980.)

The molecular weight of the polyolefins generally ranges from 10,000 to 1,000,000, as determined by gel permeation chromatography.

The polydienes are, in particular, the rubber types known to be used for this purpose, such as polybutadiene, poly-2-chlorobutadiene, or polyisoprene. (See Ullmanns, loc. cit., 4th ed., vol. 13, pp. 595-635.) Their molecular weight usually ranges from 10,000 to 1,000,000.

The composition of the ethylene-vinyl acetate copolymers may vary within certain limits. As a rule, the vinyl acetate content is between 40 and 75 percent, and preferably between 40 and 50 percent. The molecular weight generally ranges from 30,000 to 400,000. As a rule, the molecular weight given for the rubber types is the molecular weight of the polymers used prior to grafting of the hard phase. However, in a preferred embodiment these elastomers are crosslinked after grafting of the hard phase. The elastomers are preferably present in particle form. The diameter of the particles usually ranges from 0.1 to 10 microns. Particles ranging in diameter from 0.2 to 5 microns are preferred Particularly advantageous are rubber particles with hard-phase inclusions. (See Ullmanns, loc. cit., vol. 13, p. 623.)

The polyacrylates to be used in accordance with the invention are, more particularly, such whose monomeric units assure a glass-transition temperature $T_g$ of the resulting homo- or copolymer of less than 10° C., and preferably less than $-10°$ C. The glass-transition temperature $T_g$ of the homo- or copolymers is known or can be determined in the usual manner. (See R. Vieweg and F. Esser, Kunststoff-Handbuch, vol. IX, pp. 333-339, Carl Hanser Verlag, 1975; J. Brandrup and E. H. Immergut, Polymer Handbook, III, 144-148, John Wiley & Sons, 1975.)

The polyacrylates are preferably produced by polymerization in aqueous emulsion, in some cases also in suspension. Particularly when the polymer of component (B) is composed of polyacrylates, the plastic material is preferably produced by emulsion polymerization (see. H. Rauch-Puntigam and Th. Völker, Acryl-und Methacrylverbindungen, loc. cit., pp. 217-230), since plastic materials having a given particle structure can be readily obtained by this route. In particular, it is preferred to form latex particles having an outer shell composed of the polymer of component (A) and a rubber interior of crosslinked polyacrylate as component (B). Highly preferred are latex particles with a three-stage structure, that is, particles in which a hard polymer core is embedded in the polyacrylate. Overall, these polyacrylate particles with embedded hard core should have a diameter ranging from 0.1 to 3 microns, and preferably from 0.2 to 1 micron. The structure of such latex particles and the isolation of the solid polymer are described in principle in U.S. Pat. No. 4,513,118.

The emulsion polymerization is best carried out in the neutral or slightly acid pH range. The use of long-chain alkyl sulfates or alkyl sulfonates as emulsifiers will prove advantageous.

Suitable initiators are the azo compounds commonly used for the purpose as well as organic or inorganic peroxides such as potassium persulfate, or redox systems such as persulfate/hydrogen sulfite. As a rule, the initiator content will range from 0.001 to 1 percent by weight, based on the monomers.

In suspension polymerization, nonionic water-soluble dispersion stabilizers are predominantly used along with initiators such as organic peroxides or azo compounds which are soluble in the monomers. (See H. Rauch-Puntigam and Th. Völker, Acryl-und Methacrylverbindungen.) Illustrative of the monomers are ethyl acrylate, butyl acrylate, 2-ethylhexyl acrylate and alkoxy acrylates. (See U.S. Pat. No. 3,488,331.) As a rule, these acrylate elastomers also incorporate crosslinking monomers, such as allyl methacrylate, in amounts of from 0.1 to 5 percent by weight. Suitable principal components are, in particular, polybutyl acrylate and polyethyl acrylate. Of special interest as polymers of component (B) are, moreover, ethylene-propylene-diene terpolymers. (See Ullmanns, loc. cit., vol. 13, pp. 619–621; Kirk-Othmer, Encyclopedia of Industrial Chemistry, 3rd ed., vol. 8, pp. 492–500, vol. 7, pp. 687, 693, John Wiley & Sons.) With regard to their preparation, see S. Cesca, J. Polym. Sci., Macromol. Rev. 10, 1 (1975). Suitable for use as the diene component are, in particular, dicyclopentadiene, ethylidene norbornene and trans-1,4-hexadiene.

The molecular weight of ethylene-propylene-diene terpolymers produced on the commercial scale generally ranges from 200,000 to 500,000. The dynamic glass-transistion temperature for sequence types is said to range from $-45°$ to $-30°$ C. With ethylene contents of from 45 to 60 percent by weight, the terpolymers are completely amorphous. Products with ethylene contents of between 70 and 80 percent (referred to as sequence types) are believed to have partially crystalline ethylene sequences with an average of from 5 to 10 successive ethylene units.

In addition to EPDM polymers, EPTM (ethylene-propylenetriene) polymers may be used.

Other examples of polymers of component (B) are polysiloxanes. (MQ, MPQ and MPVQ, in conformity with ISO 1629, 1st ed., 1976.) The commonly used silicone rubbers generally have a dimethylpolysiloxane chain modified by specific substituents. (See Ullmanns, loc. cit., vol. 13, 628–663.)

The types which crosslink at room temperature are polysiloxanes with molecular weights of from $10^4$ to $10^5$ which carry functional groups in the terminal position. The hot-vulcanizing types, usually based on dimethylpolysiloxane (MQ), can be crosslinked at elevated temperature, for example, 150° C., with rapidly decomposing diaryl peroxides. One advantage of the inventive plastic material is that commonly used, commercial polymers can be used for component (B).

The plastic material may be produced as follows by known procedures.

As a rule, the polymer of component (B) is the initial charge, preferably in the form of a solution in a solvent suitable for further processing, for example, a solvent suited for the free-radical polymerization of the monomers of component (A). (See H. Rauch-Puntigam and Th. Völker, Acryl- und Methacrylverbindungen, loc. cit.; Brandrup-Immergut, Polymer Handbook, loc. cit.) One factor that needs to be taken into consideration is the tendency of the solvent to bring about transfer reactions.

Illustrative of such solvents are esters such as butyl acetate and ethyl acetate, hydrocarbons such as toluene, and ketones such as acetone. As a rule, the starting solution will contain from 10 to 60 percent by weight of the polymer of component (B), and the monomers and polymerization aids will be added dropwise, for example. The polymerization is usually run at elevated temperature, for example in the range from 80° to 140° C. The usual initiators, for example, peroxides or azo compounds, may be employed. (See H. Rauch-Puntigam and Th. Völker, Acryl- und Methacrylverbindungen, loc. cit.) In the case of fairly low-boiling solvents, dibenzoyl peroxide, for example, may be used, while with higher-boiling solvents tert-butyl compounds such as tert-butyl peroctoate can be used.

However, the monomers going into the polymer of component (A) themselves may serve as solvents.

The impact modifier is advantageously recovered by precipitation from the solution with methanol, for example, as precipitating agent, or by venting in an extruder. In the case of latex particles, the plastic material may be recovered by precipitation, spray drying or freeze coagulation, or by being squeezed off in the extruder.

IMPACT MODIFICATION

The plastics to be modified are mainly those whose nature is such that their impact strength or notched-bar impact strength falls short of reaching the required or desired levels. These are the plastics mentioned in the discussion of the prior art, and particularly polyvinyl chloride, polystyrene, poly-alpha-methylstyrene, polycarbonate, chlorinated rubber, and copolymers of methyl methacrylate and from 20 to 50 percent of alpha-methylstyrene, and especially the plastic materials known as molding compositions. The latter are used in the chipless flow molding of plastics under pressure and heat. (See DIN 77 08, page 1.)

As mentioned earlier, one plastic which lends itself to impact modification is polyvinyl chloride, the polymerization product of vinyl chloride, and particularly PVC with a K value between 55 and 80 or a viscosity number J of between 74 and 170 cm$^3$/g. (For determination of the K value in conformity with DIN 53,726, see Vieweg-Krekeler, Kunststoff-Handbuch, vol. 2, pt. 1, p. 58, Carl Hanser Verlag, 1983.) Particularly well suited for modification are PVC molding compositions conforming to DIN 7748 E and 7749 E. If rigid PVC is used, the K value will generally range from 57 to 65; and if flexible PVC is used, the K value will be between 65 and 70. The dynamic glass-transition temperature Tg usually ranges from 50° to 80° C. Such products are commercially available as granular materials or powders. Illustrative of these is the granular PVC LA 206 of Chemische Werke Huls.

Polystyrene (PS) will likewise benefit from impact modification. (See R. Vieweg, Kunststoff-Handbuch, vol. 5, pp. 472 ff., Carl Hanser Verlag.) As a rule, the average molecular weight of PS will range from $2.2 \times 10^5$ to $2.5 \times 10^5$. The Vicat softening point of PS molding compositions advantageously ranges from over 80° to over 110° C. (See DIN 7741 E.) PS molding compositions usually are sold in the form of granules (ranging from 2 to 4 mm in diameter), beads, or powder.

Illustrative of these are polystyrene granules of uniform size such as type 427K of BASF, Ludwigshafen.

The inventive impact modifiers can be similarly used with polymers of alpha-methylstyrene. Another material which lends itself to impact modification is polycarbonate. By polycarbonate is meant, as usual, a polycondensation product of a 4,4'-dihydroxydiphenylalkane ("bisphenol"), and particularly of 4,4'-dihydroxydiphenyl-2,2-propane, with derivatives of carbonic acid. (See DIN 7744.) Their molecular weight generally ranges from 20,000 to 60,000, and preferably from 20,000 to 30,000. Their dynamic glass-transition temperature Tg is usually 160° C. (See Kunststoff-Handbuch, vol. IX, p. 310, Carl Hanser Verlag; Kirk-Othmer, 3rd ed., vol. 18, pp. 479–497, John Wiley & Sons.) Here, too, molding compositions such as the types which are on the market are advantageously used.

Chlorinated rubber (see Kirk-Othmer, 2nd ed., vol. 17, pp. 646–650) is another material which can be impact-modified to advantage.

The plastics to be modified can be mixed with the inventive impact modifiers in the usual manner by mechanical mixing, for example, on a roll mill or in a kneader or in the extruder. (See Ullmanns, loc. cit., 4th ed., vol. 13.)

As a rule, the impact modifiers of the invention will be added to the plastics to be modified in amounts ranging from 3 to 60 percent by weight. The aim should always be to obtain an optimum overall property balance in the modified plastic.

ADVANTAGES

Surprisingly, experience has shown that the inventive impact modifiers are not only universally usable but are, in fact, definitely superior to polymer systems where anchorage of the tough phase occurs through like polymers. This is true particularly of polyvinyl chloride, poly-alpha-methylstyrene, copolymers of alphamethylstyrene and methylmethacrylate, polystyrene, polycarbonate and chlorinated rubber. The hard phase (A) grafted at least partially onto (B) is usually compatible with all these polymers. This means that the hard phase by itself, that is, without the elastomer, can be mixed with polyvinyl chloride, poly-alpha-methylstyrene, copolymers of alpha-methylstyrene and methyl methacrylate, polycarbonate, polystyrene and chlorinated rubber to give compatible polymer mixtures having but one glass-transition temperature, which is solely dependent on the composition of the mixture. The fact that the polymer of component (A) is compatible with all these polymers is all the more surprising as polymers are usually regarded as incompatible.

Illustrative of the hard phase (A) is, for example, a copolymer of methyl methacrylate and cyclohexyl methacrylate. The compatibility of the hard phase (A) with the aforesaid polymers, for example, makes the coupling of the tough phase an active process in which energy is released. As a result, the elastomer is actively anchored in the matrix. This offers substantial advantages over the passive anchoring of the elastomer phase in the matrix through like polymers.

The inventive impact modifiers, preferably with a methyl methacrylate-cyclohexyl methacrylate hard phase (A), thus are superior to conventional impact improvers.

The outstanding usability of the impact modifiers of the invention is illustrated by the examples which follow. The impact strength and the notched-bar impact strength are determined in conformity with DIN 53,453 and ISO/R 179, respectively. The Vicat softening point is determined in conformity with DIN 53,460 and IS 306, respectively.

EXAMPLES

EXAMPLE 1

Synthesis of a universally usable impact modifier with EPDM as the tough phase (B)

200 g of EPDM (ethylene-propylene-norbornadiene) commercially available as "EPSYN 55" having about 10 double bonds per 1000 carbon atoms, a molecular weight of about 300,000, a glass transition temperature of about $-60°$ C., and a ethylene: propylene ratio of 66:33 are introduced into a vessel as a 20% solution in butyl acetate. The following mixture is added dropwise to this initial charge over 2 hours at 120° C. with stirring:

260 g of methyl methacrylate,
120 g of cyclohexyl methacrylate,
20 g of cyclohexyl acrylate,
6 g of tert.-butyl peroctoate, and
600 g of butyl acetate.

The batch is stirred for 15 minutes and then cooled to 80° C. A mixture of 10 g of triallyl cyanurate, 10 g of methyl methacrylate, and 4 g of tert.-butyl peroctoate is then added and the batch is stirred for 2 hours at 80° C. and then for 2 hours at 90° C. After cooling, the product is precipitated in methanol. An impact modifier composed of about 66 percent by weight of a copolymer of methyl methacrylate, cyclohexyl acrylate, and cyclohexyl methacrylate with 33 percent by weight of EPDM is obtained. More than 10 percent by weight of the polyacrylate is grafted onto the EPDM in this product, which is suitable as a universally-usable impact modifier.

EXAMPLES 2 and 3

20 percent by weight of the impact modifier obtained in Example 1 is mixed with 80 percent by weight of different molding compositions. High impact products are obtained. The impact strength and notched-bar impact strength are particularly high with active coupling (mixing with the dissimilar, compatible, polymers PS or PC). (See following Table 1 for details.)

The improvement in impact strength in polystyrene is particularly pronounced, where in standard polystyrene an increase in impact strength from 16 to 51.9 kJ/m$^2$ is achieved. The notched-bar impact strength is raised from about 1.4 kJ/m$^2$ to 7.5 kJ/m$^2$.

EXAMPLE 4

25 percent by weight of the universally usable impact modifier of Example 1 and 75 percent by weight of PVC are mixed on a roll mill. A product which exhibits a notched-bar impact strength of 45.1 kJ/m$^2$ and a Vicat softening point of 82° C. is obtained. For comparison, unmodified PVC has a notched-bar impact strength of 2.3 kJ/m$^2$ and a Vicat softening point of 77° C.

Mixtures are similarly produced with polystyrene, polycarbonate, polyvinyl chloride, poly-α-methylstyrene, and copolymers of α-methylstyrene and methyl methacrylate.

TABLE 1

Improvement in impact strength obtained by addition of 20 wt. % of the inventive impact modifier of Example 1

| Example<br>Modified plastic | | 2<br>Polycarbonate* | 3<br>Polystyrene** |
|---|---|---|---|
| Vicat softening point | | | |
| | *** °C. | 127 | 94 |
| | 16 hr/80° C. | 127 | 99 |
| | 16 hr/100° C. | 128 | 97 |
| Impact strength (small rod) | | | |
| 23° C. | kJ/m² | No fracture | 51.9 |
| | x (average) | | |
| −20° C. | kJ/m² | No fracture | 23.5 |
| | x (average) | | |
| −40° C. | kJ/m² | No fracture | 19.2 |
| | x (average) | | |
| Notched-bar impact strength (small rod) | | | |
| 23° C. | kJ/m² | Only partly | |
| | x | fractured | 7.5 |
| | | 472 | |
| −20° C. | kJ/m² | 23.0 | 2.1 |
| | x | | |
| −40° C. | kJ/m² | 11.6 | 1.3 |
| | x | | |

*Makrolon ® 3100 (Bayer), bisphenol-A-polycarbonate, MW = ca. 40,000
**Polystyrene 158 K (BASF)
***As supplied

EXAMPLE 5

Synthesis of a universally usable impact modifier with EPDM as the tough phase

The procedure as in example 1 is followed except that a different monomer composition is used
60 percent by weight of methyl methacrylate
20 percent by weight of cyclohexyl methacrylate
20 percent by weight of butyl methacrylate.
After working up by precipitation with an appropriate quantity of methanol an impact modifier is obtained consisting of 33 percent by weight of EPDM and 67 percent by weight of a copolymer with the following composition:
60 percent by weight of methyl methacrylate
20 percent by weight of cyclohexyl methacrylate
20 percent by weight of butyl methacrylate.

EXAMPLE 6

15 parts by weight of the universally usable impact modifier obtained in example 5 is mixed with 85 percent by weight of polystyrene (158K from BASF).

A white homogeneous polymer with a vicat softening point of 97° C. (after 16 h drying at 80° C. is obtained.) The impact strength (Izod) is 51 KJ/m², notched-bar impact strength is 3.0 kg/m². In a similar manner the impact strength of PVC, of copolymers of α-methylstyrene with styrene and of copolymers of α-methyl styrene and methylmethacrylate as well as that of SAN is improved. The improvement is, however not quite as great as in the case of the modifiers described in examples 1 and 7.

EXAMPLE 7

The procedure as in example 1 is employed, except that a different monomer composition is used:
78 percent by weight of methyl methacrylate
20 percent by weight of cyclohexyl methacrylate
2 percent by weight of cyclohexyl acrylate
After working up an impact modifier, which is universally usable is obtained consisting of
33 percent by weight of EPDM
67 percent by weight of a copolymer with the following compositions:
78 percent by weight of methylmethacrylate
20 percent by weight of cyclohexyl methacrylate
2 percent by weight of cyclohexyl acrylate

EXAMPLE 8

The universally usable impact modifier obtained in example 7 is mixed with polystyrene 158K (bASF) in various proportions. Dependent on the content of modifier the following mechanical data are determined using an injection molded small rod.

| modifier added (percent by weight) | Vicat softening* temperature (°C.) | Impact strength (KJ/m²) | Notched-bar impact strength (KJ/m²) |
|---|---|---|---|
| 10 | 101 | 30 | 2,9 |
| 20 | 98 | 42 | 3,9 |
| 30 | 96 | 52 | 4,1 |

*determined after drying for 16 h at 80° C.

EXAMPLE 9

The universally usable impact modifier obtained in example 7 is mixed with a styrene acrylonitrile copolymer (SAN). At a content of just 20 percent by weight of the modifier and 80 percent by weight of SAN (Luran ® 368R, BASF) the notched-bar impact strength and in particular the impact strength are appreciably improved as compared with the unmodified material.

Unmodified Luran ® 368R has a melt flow index (200/5) of 0.7 g/10 min (determined according to ISO-recommendation no. 317) a Vicat softening temperature of 101° C., a density of 1.08 g/cm³, an impact strength of 18 KJ/m² and a notched-bar impact strength of 3.0 KJ/m².

EXAMPLE 10

The universally usable impact modifier obtained in example 7 is mixed with polycarbonate (Macrolon ® 3100, Bayer). At a content of 20 percent by weight of the modifier according to example 7 values of impact strength and notched-bar impact strength are obtained which by and large correspond to the ones obtained for modified polycarbonate obtained in example 1 (c.f. Table 1, example 2).

EXAMPLE 11

The universally usable impact modifier obtained in example 7 is mixed with PVC. At a content of 20 percent by weight of the modifier the resulting mixture is a white product, the notched-bar impact strength of which is more than twice as high as that of unmodified PVC.

EXAMPLE 12

The universally usable impact modifier obtained in example 7 is mixed with a copolymer consisting of 68 percent by weight of methyl methacrylate, 30 percent by weight of α-methyl styrene and 2 percent by weight of methyl acrylate (molecular weight MW=about 120 000). The mixture thus obtained can be readily processed. At a modifier content of 20 percent by weight only the notched-bar impact strength has more than doubled as compared with the unmodified material.

EXAMPLE 13

Synthesis of an impact modifier with a high proportion of an elastomer

The procedure as in example 1 is followed, except that only 100 percent by weight of the monomer mixture (based on EPDM dissolved in butyl acetate) is employed: Composition of the monomer mixture:
52 percent by weight of methyl methacrylate
45 percent by weight of cyclohexyl methacrylate
3 percent by weight of cyclohexyl acrylate
The resulting impact modifier consists of
50 percent by weight of EPDM
50 percent by weight of a copolymer consisting of
  52 percent by weight of methyl methacrylate
  45 percent by weight of cyclohexyl methacrylate
  3 percent by weight of cyclohexyl acrylate.

EXAMPLE 14

20 percent by weight of the universally usable impact modifier of example 13 and 80 percent by weight of polystyrene 158 K are mixed in a roll mill. The mixture is used for producing small rods by injection molding.

The white material obtained in this manner have the following data:

| impact strength (small rod) | | 28 KJ/m$^2$ |
|---|---|---|
| Notched-bar impact strength (small rod) | 23° C. | 5,4 KJ/m$^2$ |
| | 0° C. | 4,0 KJ/m$^2$ |
| | −10° C. | 3,6 KJ/m$^2$ |

EXAMPLE 15

Synthesis of a universally usable impact modifier by a two-phase emulsion polymerization By using addition polymerisation at 80° C. for 4 hours the following polymer dispersion is produced:
Solids content:
40 percent by weight (the remainder being water).
Composition of the core:
98 percent by weight of butyl acrylate
1 percent by weight of allyl methacrylate
1 percent by weight of trimethylolpropan triacrylate.
Composition of the shell:
65 percent by weight of methyl methacrylate
30 percent by weight of cyclohexyl methacrylate
5 percent by weight of cyclohexyl acrylate.
Diameter of the particels of the dispersion is about 400 nm ratio core to shell is 65:35 by weight.

The solid polymer is obtained by freeze coagulation followed by drying. When mixing the universally usable impact modifier with polystyrene, polycarbonate, PVC, SAN, copolymers of methyl methacrylate and α-methyl styrene the impact strength of the mixture is markedly improved in each case as compared with the unmodified polymers. With polycarbonate the improvement lies more on the side of notched-bar impact strength.

What is claimed is:

1. An impact modified synthetic resin comprising (I) from 40 to 97 percent by weight of a synthetic resin selected from the group consisting of polyvinyl chloride, polystyrene, polycarbonate, poly-α-methylstyrene, and copolymers of methyl methacrylate with from 20 to 50 percent by weight of α-methylstyrene, and (II), as an impact modifier, from 3 to 60 percent by weight of a composition comprising
    (A) from 10 to 80 percent by weight of a polymer of the formula

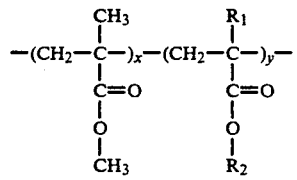

wherein R$_1$ is hydrogen or methyl and R$_2$ is C$_5$–C$_7$ cycloalkyl or such cycloalkyl substituted by C$_1$–C$_{12}$ alkyl, y has a value such that the corresponding monomer or monomers are from 5 to 50 percent by weight of polymer (A), and x has a value such that the corresponding monomer is the balance by weight, and
    (B) from 20 to 90 percent by weight of a polymer having a glass transition temperature, T$_g$, below 10° C., said polymer being at least partially covalently bonded to polymer (A).

2. A modified resin as in claim 1 wherein polymer (A) additionally comprises up to 20 percent by weight of one or more further monomers copolymerizable therewith, the value of x being reduced accordingly.

3. A modified resin as in claim 1 wherein polymer (B) is crosslinked.

4. A modified resin as in claim 1 wherein the glass transition temperature, T$_g$, of polymer (B) is below −10° C.

5. A modified resin as in claim 1 wherein polymer (B) is covalently bonded to polymer (A) to an extent of more than 5 percent by weight.

* * * * *